(12) United States Patent
Flowers

(10) Patent No.: US 6,669,862 B1
(45) Date of Patent: Dec. 30, 2003

(54) REFRIGERANT COMPOSITION

(75) Inventor: James W. Flowers, Ontario (CA)

(73) Assignee: Protocol Resource Management Inc., Ontario (CA)

( * ) Notice: Subject to any disclaimer, the term of this patent is extended or adjusted under 35 U.S.C. 154(b) by 0 days.

(21) Appl. No.: 10/347,170

(22) Filed: Jan. 17, 2003

(51) Int. Cl.$^7$ ................................................ C09K 5/04
(52) U.S. Cl. .......................................................... 252/67
(58) Field of Search ........................................... 252/67

(56) References Cited

U.S. PATENT DOCUMENTS

| | | |
|---|---|---|
| 5,185,094 A | 2/1993 | Shiflett |
| 5,543,068 A * | 8/1996 | Kaimai et al. ................ 252/68 |
| 5,554,311 A | 9/1996 | Katafuchi et al. |
| 5,643,492 A | 7/1997 | Shiflett |
| 5,647,224 A | 7/1997 | Kushiro et al. |
| 5,675,046 A | 10/1997 | Ohno et al. |
| 5,709,092 A | 1/1998 | Shiflett |
| 5,736,063 A | 4/1998 | Richard et al. |
| 5,910,161 A | 6/1999 | Fujita et al. |
| 6,035,648 A | 3/2000 | Hichman et al. |
| 6,187,219 B1 | 2/2001 | Omure et al. |
| 6,207,071 B1 | 3/2001 | Takigawa et al. |
| 6,221,274 B1 | 4/2001 | Akahori et al. |
| 6,357,257 B1 * | 3/2002 | Goble, Jr. et al. ............ 62/613 |
| 6,363,741 B2 | 4/2002 | Takemasa |
| 2001/0017364 A1 | 8/2001 | Takemasa |
| 2001/0023596 A1 | 9/2001 | Fujita et al. |
| 2002/0000534 A1 | 1/2002 | Richard et al. |

FOREIGN PATENT DOCUMENTS

JP    8-337774    * 12/1996

* cited by examiner

*Primary Examiner*—John Hardee
(74) *Attorney, Agent, or Firm*—Linda M. Buckley; John B. Alexander; Edwards & Angell, LLP

(57) ABSTRACT

A refrigerant composition comprises a mixture of three HFC (hydrofluorocarbons) refrigerants, namely, HFC 32, HFC 125 and HFC 134a. A lower alkyl alcohol such as ethanol is included in the mixture to improve miscibility in commonly-used lubricants such as mineral oil by altering the viscosity of the entrained oil within the operating air-conditioning system. Optionally, a fifth component made be added, namely a hydrocarbon based refrigerant such as iso-butane or propane, to further improve characteristics of refrigerant. The resulting refrigerant is similar in characteristics to R22, and is compatible with existing air-conditioning and refrigeration devices originally for use with R22 refrigerant without system modifications.

18 Claims, No Drawings

REFRIGERANT COMPOSITION

BACKGROUND OF THE INVENTION

1. Field of the Invention

The invention relates to a refrigerant composition for use in a compressor-type refrigerating apparatus. Specifically, the invention relates to refrigerants containing HFC compounds in place of environmentally-harmful chlorinated flourocarbons.

2. Description of the Prior Art

Conventional commercially-available refrigerants typically comprise a mixture of various components including one or more fluorocarbons. Such refrigerants are widely used as refrigerants in air conditioning systems, refrigerators and other heat pump applications. Conventional heat pumps operate on a principal of cyclic compression and decompression of the refrigerant, which may undergo a phase conversation between liquid and gas. Heat is absorbed or removed from a space by changing the refrigerant from a liquid to a gas or otherwise reducing the pressure of the refrigerant. The refrigerant is then compressed within a compressor, which significantly raises the pressure of the vapour. The high pressure vapor is conveyed to a condenser, and undergoes a heat exchange with a cooler medium such as the surrounding air. The release of heat energy to the surrounding air causes the refrigerant to drop in temperature and condense to a liquid. The cooled liquid refrigerant is transmitted back to the cool side, and passed through an expansion valve which lowers the pressure of the liquid causing the liquid vaporize by absorbing heat energy from the surrounding air, thus commencing the cycle again.

It has been found that certain refrigerants possess good qualities for use with such a system, owning to their ability to undergo a phase change at or near the temperatures usually found at the warm and cool sides of the heat pump, under pressures readily obtainable by an inexpensive compressor. Until recently, chlorofluorocarbons were in widespread use, either in the form of a single compound or isotropic mixtures containing one or more chlorofluorocarbons (CFCs). In recent years, environmental considerations have placed severe restrictions on the use of CFCs, as these have been found to cause damage to the earth's ozone layer. In response to this challenge, alternative refrigerants were developed containing hydrofluorocarbons ("HFC") refrigerants, thus avoiding the use of environmentally-harmful chlorinated compounds. The prior art discloses various multi-component HFC mixtures. By way of several representative examples:

U.S. Pat. No. 6,035,648 to Hickman et al. discloses a refrigerant mixture consisting of R-32, R-125 and R-134a in the approximate ratio of 25/25/50. A different mixture of the same three components is disclosed in U.S. Pat. No. 5,736,063, to Richard et al. This reference also discloses two component mixtures, and mixtures containing propane as a component, as well as carbon dioxide. U.S. Pat. No. 5,709,092 to Shiflett discloses a mixture of the same three components, in the range of 5–59% HFC 125; 5–59% HFC 32; and 5–35% HFC 134 or 134a. Propane also is disclosed as an additional component. A mixture of the same three components is disclosed in U.S. Pat. No. 5,647,224, to Kushiro et al.

Desirably, a refrigerant should be chemically stable, possessed of low toxicity and suitable for use in a mechanical system in which the refrigerant is exposed to lubricants and metals, without causing corrosion or excessive lubricant degradation.

In a further aspect, a refrigerant should be miscible with the lubricants used in a variety of refrigerating devices. Conventional CFC-free refrigerants are not suitable for use in a range of refrigerating devices but rather they typically are formulated to work in a single type of device. Since many refrigerating devices employ mineral oil as a lubricant, the refrigerant should be miscible with this lubricant. Conventional HFC refrigerants tend to be not miscible or easily miscible with mineral oil and are thus not suitable for such uses. It is desirable to provide a CFC-free refrigerant suitable for use in a number of different types of refrigerating devices, in order to simplify fabrication and maintenance of a variety of such devices.

SUMMARY OF THE INVENTION

The present invention comprises a mixture of three HFC refrigerants components, along with an alcohol. The alcohol must have a suitable critical temperature which is compatible with the use of the refrigerant. Preferrably a lower alkyl or branched alkyl alcohol including methanol or ethanol. The most preferred is ethanol, preferably anhydrous ethanol. The function of the alcohol is to improve miscibility with lubricants typically found in refrigerating devices, in particular mineral oils of the type used in the mechanical components of existing R22 based refrigerating systems. The three HFC components are HFC 32, HFC 125 and HFC 134a. Optionally, the mixture includes a fifth component, namely a lower alkyl hydrocarbon such as R290 (propane) or isobutane. The refrigerant of the present invention is formulated into a composition compatible with and suitable for use in at least one conventional refrigerating device and preferrably several such devices, i.e. having a vapour pressure or critical temperature which is similar to that of conventional refrigerating devices.

Without wishing to be restricted to any theory, it is believed that the addition of the alcohol component enhances the performance of the composition by altering the viscosity of the oil that becomes entrained within the refrigerant during operation of the refrigerating device.

The composition of the present invention comprises HFC 32 in the amount of about 20% to 25% by weight; HFC 125 in the amount of about 22% to 28% by weight; HFC 134a in the amount of about 48% to 54% by weight; and a lower alkyl alcohol in the amount of about 0.08 to 1% by weight.

In one aspect, the invention is a refrigerant composition comprising HFC 32 from about 22% to 24% by weight; HFC 125 in the amount of about 24 to 26 by weight and HFC 134a, in the amount of about 49% to 53.3% by weight; and lower alkyl alcohol in the amount of about 0.6% to 0.8% by weight.

In one aspect, the refrigerant comprises the following formulation:

In a still more preferred embodiment, the mixture comprises HFC 32 at about 23% by weight; HFC 125 at about 25% by weight, HFC 134a at about 51.3% by weight and ethanol in the amount of about 0.7% by weight.

Optionally, an additional component is added to the mixture, namely a lower alkyl hydrocarbon in the amount of between 0% and 4.0% by weight. "Lower alkyl" means a straight or branched chain $C_1$–$C_6$ with a preferred species being isobutane propane with propane being most preferred. Suitable alkyls are those which exist in the gas phase at room temperature and atmospheric pressure. Another suitable lower alkyl is isobutane.

The term "about" used herein means a variation of ±0.1 from the expressed percentages.

DETAILED DESCRIPTION OF THE INVENTION

Having generally described the invention, a detailed and specific example is presented which is within the scope of the invention but which is merely illustrated of the invention.

Example

A refrigerant composition SP22C was formulated, consisting of a mixture of HFC 32 (difluoromethane) at 23% by weight, HFC 125 (pentafluorommethane) at 25% by weight, HFC 134a (1, 1, 1, 2 tetrafluoromethane) at 51.3% by weight; and anhydrous ethanol at 0.7% by weight. In the example, it is believed that all of the above amounts were within 0.1% of the expressed amount.

The order of introducing components into the composition is not of any consequence. Conventional methods were used to formulate, store and use the composition.

The mean boiling point (BP) of the above mixture was measured at −40.1 deg. C. @ 1 atm.

The critical temperature (CT) of the mixture was determined to be 86.0 deg. C.

For purposes of comparison, the corresponding BP of the common refrigerant R22 is −40.8 deg. C, @ 1 atm.

In testing, the above composition was found to be miscible in the following mineral oils: 4GS and 3GS, which are typically found in existing R22 based systems. The composition was also found to be effective as a refrigerant working fluid.

Table 1 shows data generated from testing on R22, a prior art CFC-containing refrigerant. The test was carried out over four cycles, at an ambient temperature of 82° F. Tables 2 through 5 data generated from similar tests carried out on the composition of the above example, (identified as composition SP 22 C) indicating level of performance for the present formulation.

Tables 2, 3 and 4 show test data relating to testing of SP 22 C running in the same R22 rated unit as the data of Table 1, at three different ambient temperature and humidity conditions. Hence, test A (Table 2) was carried out an indoor dry and wet bulb temperature condition of 80 and 67 respectively and an outdoor dry bulb temperature of 95° (all in Fahrenheit). In test B (Table 3) the respective conditions were 80°/57° and 82°. In test C (Table 4) the comparative conditions were 80°/57° and 82°. In test D (Table 5) the comparative conditions were: 80°/57° and 82°. The test data of Table 5 (test D) is a "cycle test" to verify consistency in the test data. That is, the test machine charged with compound SP 22 C is cycled on and off in predetermined intervals to ensure that the data generated in the previous tests is repeatable with little or no deviation, to illustrate that such a unit can cycle independently with little loss of efficiency.

Although this invention has been described by way of a preferred embodiment, it will be seen by one skilled in the relevant art or arts that the full scope of this invention includes any number of variations of and departures from the described non-limiting example. The full scope of this invention is best described by the claims set out in this specification.

TABLE 1

Unit: M # HIRA018506D & F2RP024N06B  
Date: Jun. 3, 2002  
Voltage: 208 VAC 60 Hz  
Run: #16    Test D, 80/57—82**  
Barometer: 29.09" Hg  
Charge: R-22, 3.90 lbs

| 0 Location | Cycle 1 off Average | Cycle 1 on Average | Cycle 2 off Average | Cycle 2 on Average | Cycle 3 off Average | Cycle 3 on Average | Cycle 4 off Average | Cycle 4 on Average | Units |
|---|---|---|---|---|---|---|---|---|---|
| 1 Suction PSIG | 145.73 | 82.00 | 145.73 | 80.74 | 146.21 | 79.08 | 146.16 | 80.20 | PSIG |
| 2 Saturation Temp. | N/A | 48.79 | N/A | 48.02 | N/A | 46.95 | N/A | 47.68 | Deg. F. |
| 3 Suction @ Compressor | 101.05 | 68.31 | 95.79 | 69.31 | 94.01 | 69.23 | 93.46 | 70.09 | Deg. F. |
| 4 Superheat | N/A | 19.52 | N/A | 21.29 | N/A | 22.28 | N/A | 22.41 | Deg. F. |
| 5 Discharge @ Comp. PSIG | 148.50 | 227.31 | 148.53 | 226.97 | 148.98 | 226.82 | 148.80 | 226.72 | PSIG |
| 6 Saturation Temp. | N/A | 110.28 | N/A | 110.18 | N/A | 110.13 | N/A | 110.10 | Deg. F. |
| 7 Discharge @ Comp. | 97.28 | 159.39 | 94.83 | 156.95 | 94.15 | 156.90 | 93.79 | 155.90 | Deg. F. |
| 8 Liquid @ OD Coil PSIG | 148.03 | 212.34 | 148.10 | 212.82 | 148.59 | 213.77 | 148.40 | 212.88 | PSIG |
| 9 Saturation Temp. | N/A | 105.52 | N/A | 105.68 | N/A | 105.99 | N/A | 105.70 | Deg. F. |
| 10 Leaving OD Coil | 80.59 | 94.34 | 80.56 | 94.17 | 80.71 | 94.29 | 80.65 | 94.18 | Deg. F. |
| 11 Liquid @ ID Coil PSIG | 148.58 | 211.00 | 148.71 | 211.30 | 148.96 | 212.95 | 148.59 | 211.88 | PSIG |
| 12 Saturation Temp. | N/A | 105.08 | N/A | 105.18 | N/A | 105.72 | N/A | 105.37 | Deg. F. |
| 13 Liquid @ ID Coil | 79.76 | 93.45 | 80.16 | 93.27 | 80.31 | 93.43 | 80.29 | 93.29 | Deg. F. |
| 14 Subcool | N/A | 11.63 | N/A | 11.91 | N/A | 12.29 | N/A | 12.08 | Deg. F. |
| 15 Vapor @ ID Coil PSIG | 147.25 | 84.72 | 147.26 | 83.54 | 147.73 | 81.79 | 147.69 | 82.88 | PSIG |
| 15.1 Saturation Temp. | N/A | 50.44 | N/A | 49.72 | N/A | 48.66 | N/A | 49.32 | Deg. F. |
| 17 Leaving ID Coil | 75.85 | 63.51 | 76.49 | 65.67 | 76.85 | 65.72 | 76.95 | 66.24 | Deg. F. |
| 18 Compressor Dome | 113.64 | 102.62 | 106.13 | 97.75 | 103.52 | 95.99 | 102.60 | 95.75 | Deg. F. |
| 19 Compressor Sump | 120.09 | 111.21 | 111.16 | 105.08 | 108.28 | 103.37 | 107.37 | 102.64 | Deg. F. |
| 20 Inlet Grid | 80.16 | 79.92 | 80.14 | 79.92 | 80.13 | 79.98 | 80.14 | 79.95 | Deg. F. |
| 20.1 Discharge Grid | 71.72 | 63.24 | 72.69 | 63.30 | 73.00 | 62.86 | 73.25 | 63.36 | Deg. F. |
| 21 Tunnel Grid | 67.95 | 66.51 | 70.53 | 67.11 | 71.13 | 67.07 | 71.29 | 67.34 | Deg. F. |
| 25 Indoor Dry Bulb | 80.08 | 79.85 | 80.05 | 79.85 | 80.04 | 79.86 | 80.04 | 79.87 | Deg. F. |
| 26 Indoor Wet Bulb | 59.21 | 59.09 | 59.37 | 59.45 | 59.67 | 59.59 | 60.46 | 63.31 | Deg. F. |
| 27 E102.3 OD Dry Bulb | 81.90 | 82.26 | 81.93 | 82.33 | 81.91 | 82.31 | 81.93 | 82.32 | Deg. F. |
| 28 E102.4 OD Wet Bulb | 60.02 | 60.20 | 60.12 | 60.40 | 60.15 | 60.29 | 60.20 | 60.40 | Deg. F. |
| 29 Discharge Dry Bulb | 67.36 | 69.79 | 69.37 | 70.71 | 69.87 | 70.93 | 70.12 | 71.18 | Deg. F. |
| 30 Discharge Wet Bulb | 55.17 | 55.48 | 55.95 | 56.11 | 56.27 | 56.11 | 56.24 | 56.30 | Deg. F. |
| 31 Blower Watts | 0.00 | 0.36 | 0.00 | 0.35 | 0.00 | 0.35 | 0.00 | 0.35 | KW |

TABLE 1-continued

Unit: M # HIRA018506D & F2RP024N06B  
Date: Jun. 3, 2002  
Voltage: 208 VAC 60 Hz  
Run: #16   Test D, 80/57—82**  
Barometer: 29.09" Hg  
Charge: R-22, 3.90 lbs

| 0 | Location | Cycle 1 off Average | Cycle 1 on Average | Cycle 2 off Average | Cycle 2 on Average | Cycle 3 off Average | Cycle 3 on Average | Cycle 4 off Average | Cycle 4 on Average | Units |
|---|---|---|---|---|---|---|---|---|---|---|
| 32 | Condensing Unit Watts | 0.00 | 1.55 | 0.00 | 1.56 | 0.00 | 1.57 | 0.00 | 1.57 | KW |
| 33 | Net Air Side Capacity | N/A | 209.92 | N/A | 210.08 | N/A | 210.38 | N/A | 210.4 | Volts |
| 34 | Voltage B to C | N/A | 208.58 | N/A | 208.77 | N/A | 209.09 | N/A | 209.19 | Volts |
| 35 | Voltage L2 to N | N/A | 119.30 | N/A | 119.35 | N/A | 119.51 | N/A | 119.52 | Volts |
| 36 | Voltage L3 to N | N/A | 121.88 | N/A | 122.07 | N/A | 122.28 | N/A | 122.33 | Volts |
| 37 | AMPS 2 | N/A | 9.28 | N/A | 9.30 | N/A | 9.29 | N/A | 9.30 | Amps |
| 38 | AMPS 3 | N/A | 9.29 | N/A | 9.31 | N/A | 9.31 | N/A | 9.33 | Amps |
| 39 | kWatts TOTAL | N/A | 1.91 | N/A | 1.91 | N/A | 1.92 | N/A | 1.92 | KW |
| 40 | FREQ. | N/A | 59.91 | N/A | 59.93 | N/A | 59.90 | N/A | 59.94 | Hz |

TABLE 2

Manufacturer: Protocol  
Unit: M # HIRA018506D & F2RP024N06B  
Date: 5/30/02  
Voltage: 208 VAC 60 Hz  
Run: # 1A Test A 80/67--95**  
Barometer: 29.05" Hg  
Charge: SP-22C, 3.70 lbs

| 0 | Location | Average | Units |
|---|---|---|---|
| 1 | Suction PSIG | 86.17 | PSIG |
| 2 | Saturation Temp. | 51.15 | Deg. F |
| 3 | Suction @ Compressor | 62.30 | Deg. F |
| 4 | Superheat | 11.16 | Deg. F |
| 5 | Discharge @ Comp. PSIG | 272.00 | PSIG |
| 6 | Saturation Temp. | 113.00 | Deg. F |
| 7 | Discharge @ Comp. | 162.08 | Deg. F |
| 8 | Liquid @ OD Coil PSIG | 259.47 | PSIG |
| 9 | Saturation Temp. | 112.00 | Deg. F |
| 10 | Leaving OD Coil | 110.90 | Deg. F |
| 11 | Liquid @ ID Coil PSIG | 258.37 | PSIG |
| 12 | Saturation Temp. | 112.00 | Deg. F |
| 13 | Liquid @ ID Coil | 109.42 | Deg. F |
| 14 | Subcool | 2.62 | Deg. F |
| 15 | Vapor @ ID Coil PSIG | 89.10 | PSIG |
| 15.1 | Saturation Temp. | 51.50 | Deg. F |
| 17 | Leaving ID Coil | 60.90 | Deg. F |
| 18 | Compressor Dome | 102.38 | Deg. F |
| 19 | Compressor Sump | 119.60 | Deg. F |
| 20 | Tunnel Grid | 65.95 | Deg. F |
| 22 | Discharge Airflow | 877.90 | SCFM |
| 23 | Static | 0.10 | In Water |
| 24 | Condensate from ID Coil | 15.46 | Oz |
| 25 | Indoor Dry Bulb | 80.01 | Deg. F |
| 26 | Indoor Wet Bulb | 67.12 | Deg. F |
| 27 | E102.3 OD Dry Bulb | 95.01 | Deg. F |
| 28 | E102.4 OD Wet Bulb | 67.65 | Deg. F |
| 29 | Discharge Dry Bulb | 64.78 | Deg. F |
| 30 | Discharge Wet Bulb | 61.30 | Deg. F |
| 31 | Blower Watts | 0.34 | KW |
| 32 | Condensing Unit Watts | 1.70 | KW |
| 33 | Voltage A to B | 208.86 | Volts |
| 34 | Voltage B to C | 207.70 | Volts |
| 35 | Voltage L2 to N | 118.27 | Volts |
| 36 | Voltage L3 to N | 122.04 | Volts |
| 37 | AMPS 2 | 9.93 | Amps |
| 38 | AMPS 3 | 9.97 | Amps |
| 39 | kWatts TOTAL | 2.04 | KW |
| 40 | FREQ. | 59.98 | Hz |
| 41 | Gross Air Side Capacity | 18310.8 | Btu/H |
| 42 | Net Air Side Capacity | 17150.4 | Btu/H |
| 43 | EER | 8.41 | Btu/W*H |
| 44 | Calc. Sensible Cap. | 14575.07 | Btu |
| 45 | Sensible + Condensate | 16623.52 | Btu |
|  | Condensate Balance | 103.1695 | % Air/Cond. |

TABLE 3

Manufacturer: Protocol  
Unit: M # HIRA018506D & F2RP024N06B  
Date: 5/31/02  
Voltage: 208 VAC 60 Hz  
Run: # 2A Test B 80/67--82**  
Barometer: 29.02" Hg  
Charge: SP-22C, 3.70 lbs

| 0 | Location | Average | Units |
|---|---|---|---|
| 1 | Suction PSIG | 81.35 | PSIG |
| 2 | Saturation Temp. | 46.05 | Deg. F |
| 3 | Suction @ Compressor | 66.99 | Deg. F |
| 4 | Superheat | 20.94 | Deg. F |
| 5 | Discharge @ Comp. PSIG | 231.45 | PSIG |
| 6 | Saturation Temp. | 104 | Deg. F |
| 7 | Discharge @ Comp. | 155.37 | Deg. F |
| 8 | Liquid @ OD Coil PSIG | 217.43 | PSIG |
| 9 | Saturation Temp. | 99.2 | Deg. F |
| 10 | Leaving OD Coil | 98.19 | Deg. F |
| 11 | Liquid @ ID Coil PSIG | 216.30 | PSIG |
| 12 | Saturation Temp. | 99 | Deg. F |
| 13 | Liquid @ ID Coil | 97.37 | Deg. F |
| 14 | Subcool | 1.63 | Deg. F |
| 15 | Vapor @ ID Coil PSIG | 84.10 | PSIG |
| 15.1 | Saturation Temp. | 49.5 | Deg. F |
| 17 | Leaving ID Coil | 62.05 | Deg. F |
| 18 | Compressor Dome | 98.86 | Deg. F |
| 19 | Compressor Sump | 113.88 | Deg. F |
| 20 | Tunnel Grid | 65.28 | Deg. F |
| 22 | Discharge Airflow | 875.4 | SCFM |
| 23 | Static | 0.1 | In Water |
| 24 | Condensate from ID Coil | 25.15 | Oz |
| 25 | Indoor Dry Bulb | 80.01 | Deg. F |
| 26 | Indoor Wet Bulb | 67.01 | Deg. F |

TABLE 3-continued

Manufacturer: Protocol
Unit: M # HIRA018506D & F2RP024N06B
Date: 5/31/02
Voltage: 208 VAC 60 Hz
Run: # 2A Test B 80/67--82**
Barometer: 29.02" Hg
Charge: SP-22C, 3.70 lbs

| 0  | Location              | Average  | Units     |
|----|-----------------------|----------|-----------|
| 27 | E102.3 OD Dry Bulb    | 82.01    | Deg. F    |
| 28 | E102.4 OD Wet Bulb    | 62.96    | Deg. F    |
| 29 | Discharge Dry Bulb    | 64.24    | Deg. F    |
| 30 | Discharge Wet Bulb    | 60.53    | Deg. F    |
| 31 | Blower Watts          | 0.34     | KW        |
| 32 | Condensing Unit Watts | 1.57     | KW        |
| 33 | Voltage A to B        | 208.74   | Volts     |
| 34 | Voltage B to C        | 207.74   | Volts     |
| 35 | Voltage L2 to N       | 123.57   | Volts     |
| 36 | Voltage L3 to N       | 118.43   | Volts     |
| 37 | AMPS 2                | 9.32     | Amps      |
| 38 | AMPS 3                | 9.33     | Amps      |
| 39 | kWatts TOTAL          | 1.91     | KW        |
| 40 | FREQ.                 | 59.92    | Hz        |
| 41 | Gross Air Side Capacity | 20070.1 | Btu/H    |
| 42 | Net Air Side Capacity | 18909.6  | Btu/H     |
| 43 | EER                   | 9.9      | Btu/W*H   |
| 44 | Calc. Sensible Cap.   | 15045.48 | Btu       |
| 45 | Sensible + Condensate | 18377.66 | Btu       |
|    | Condensate Balance    | 102.8934 | % Air/Cond. |

TABLE 4

Manufacturer: Protocol
Unit: M # HIRA018506D & F2RP024N06B
Date: 5/31/02
Voltage: 208 VAC 60 Hz
Run: # 3A Test C 80/57--82**
Barometer: 28.94" Hg
Charge: SP-22C, 3.70 lbs

| 0  | Location              | Average | Units |
|----|-----------------------|---------|-------|
| 1  | Suction PSIG          | 78.08   | PSIG  |
| 2  | Saturation Temp.      | 44.60   | Deg. F |
| 3  | Suction @ Compressor  | 62.53   | Deg. F |
| 4  | Superheat             | 17.93   | Deg. F |
| 5  | Discharge @ Comp. PSIG | 229.02 | PSIG  |
| 6  | Saturation Temp.      | 104.00  | Deg. F |
| 7  | Discharge @ Comp.     | 153.69  | Deg. F |
| 8  | Liquid @ OD Coil PSIG | 215.79  | PSIG  |
| 9  | Saturation Temp.      | 98.90   | Deg. F |
| 10 | Leaving OD Coil       | 97.54   | Deg. F |
| 11 | Liquid @ ID Coil PSIG | 215.08  | PSIG  |
| 12 | Saturation Temp.      | 99.80   | Deg. F |

TABLE 4-continued

Manufacturer: Protocol
Unit: M # HIRA018506D & F2RP024N06B
Date: 5/31/02
Voltage: 208 VAC 60 Hz
Run: # 3A Test C 80/57--82**
Barometer: 28.94" Hg
Charge: SP-22C, 3.70 lbs

| 0    | Location              | Average | Units    |
|------|-----------------------|---------|----------|
| 13   | Liquid @ ID Coil      | 96.93   | Deg. F   |
| 14   | Subcool               | 2.87    | Deg. F   |
| 15   | Vapor @ ID Coil PSIG  | 80.95   | PSIG     |
| 15.1 | Saturation Temp.      | 45.80   | Deg. F   |
| 17   | Leaving ID Coil       | 59.49   | Deg. F   |
| 18   | Compressor Dome       | 96.92   | Deg. F   |
| 19   | Compressor Sump       | 112.34  | Deg. F   |
| 20   | Inlet Grid            | 80.13   | Deg. F   |
| 20.1 | Discharge Grid        | 61.54   | Deg. F   |
| 21   | Tunnel Grid           | 62.72   | Deg. F   |
| 22   | Discharge Airflow     | 877.70  | SCFM     |
| 23   | Static                | 0.10    | In Water |
| 24   | Condensate from ID Coil | N/A   | Oz       |
| 25   | Indoor Dry Bulb       | 80.00   | Deg. F   |
| 26   | Indoor Wet Bulb       | 58.79   | Deg. F   |
| 27   | E102.3 OD Dry Bulb    | 82.00   | Deg. F   |
| 28   | E102.4 OD Wet Bulb    | 60.31   | Deg. F   |
| 29   | Discharge Dry Bulb    | 61.57   | Deg. F   |
| 30   | Discharge Wet Bulb    | 51.73   | Deg. F   |
| 31   | Blower Watts          | 0.34    | KW       |
| 32   | Condensing Unit Watts | 1.56    | KW       |
| 33   | Voltage A to B        | 208.31  | Volts    |
| 34   | Voltage B to C        | 206.51  | Volts    |
| 35   | Voltage L2 to N       | 118.26  | Volts    |
| 36   | Voltage L3 to N       | 120.97  | Volts    |
| 37   | AMPS 2                | 9.23    | Amps     |
| 38   | AMPS 3                | 9.28    | Amps     |
| 39   | kWatts TOTAL          | 1.90    | KW       |
| 40   | FREQ.                 | 59.97   | Hz       |
| 41   | Gross Air Side Capacity | 18438.1 | Btu/H  |
| 42   | Net Air Side Capacity | 17277.7 | Btu/H    |
| 43   | EER                   | 9.09    | Btu/H    |

TABLE 5

Manufacturer: Protocol
Unit: M # HIRA018506D & F2RP024N06B
Date: May 31, 2002
Voltage: 208 VAC 60 Hz
Run: #4A  Test D, 80/67—82**
Barometer: 28.94" Hg
Charge: SP-22C, 3.70 lbs

| 0 | Location | Cycle 1 off Average | Cycle 1 On Average | Cycle 2 off Average | Cycle 2 on Average | Cycle 3 off Average | Cycle 3 on Average | Cycle 4 off Average | Cycle 4 on Average |
|---|----------|---------------------|--------------------|---------------------|--------------------|---------------------|--------------------|---------------------|--------------------|
| 1 | Suction PSIG | 148.19 | 79.34 | 148.43 | 78.55 | 148.64 | 78.46 | 148.85 | 77.97 |
| 2 | Saturation Temp. | N/A | 45.32 | N/A | 44.85 | N/A | 44.80 | N/A | 44.55 |
| 3 | Suction @ Compressor | 96.21 | 63.75 | 91.32 | 64.05 | 90.38 | 64.10 | 89.96 | 64.20 |
| 4 | Superheat | N/A | 18.43 | N/A | 19.20 | N/A | 19.30 | N/A | 19.65 |
| 5 | Discharge @ Comp. PSIG | 151.04 | 229.98 | 151.30 | 229.83 | 151.48 | 228.98 | 151.80 | 229.52 |

TABLE 5-continued

Manufacturer: Protocol
Unit: M # HIRA018506D & F2RP024N06B
Date: May 31, 2002
Voltage: 208 VAC 60 Hz
Run: #4A    Test D, 80/67—82**
Barometer: 28.94" Hg
Charge: SP-22C, 3.70 lbs

| 0 | Location | Cycle 1 off Average | Cycle 1 On Average | Cycle 2 off Average | Cycle 2 on Average | Cycle 3 off Average | Cycle 3 on Average | Cycle 4 off Average | Cycle 4 on Average |
|---|---|---|---|---|---|---|---|---|---|
| 6 | Saturation Temp. | N/A | 104.00 | N/A | 103.90 | N/A | 103.10 | N/A | 103.75 |
| 7 | Discharge @ Comp. | 95.88 | 145.82 | 95.10 | 144.36 | 94.69 | 143.80 | 94.53 | 143.81 |
| 8 | Liquid @ OD Coil PSIG | 149.20 | 216.83 | 150.93 | 215.90 | 149.92 | 216.04 | 150.15 | 216.56 |
| 9 | Saturation Temp. | N/A | 98.10 | N/A | 97.80 | N/A | 97.85 | N/A | 98.05 |
| 10 | Leaving OD Coil | 79.84 | 97.42 | 79.89 | 97.28 | 79.90 | 97.09 | 80.31 | 97.18 |
| 11 | Liquid @ ID Coil PSIG | 150.75 | 214.95 | 151.00 | 215.32 | 151.22 | 214.62 | 151.46 | 215.24 |
| 12 | Saturation Temp. | N/A | 97.65 | N/A | 97.70 | N/A | 97.55 | N/A | 97.7 |
| 13 | Liquid @ ID Coil | 79.76 | 96.38 | 79.75 | 96.28 | 79.99 | 96.11 | 79.98 | 96.18 |
| 14 | Subcool | N/A | 1.01 | N/A | 1.42 | N/A | 1.44 | N/A | 1.52 |
| 15 | Vapor @ ID Coil PSIG | 149.66 | 82.26 | 149.89 | 81.38 | 150.09 | 81.31 | 150.36 | 80.88 |
| 15.1 | Saturation Temp. | N/A | 46.60 | N/A | 46.10 | N/A | 46.10 | N/A | 45.95 |
| 17 | Leaving ID Coil | 77.21 | 61.89 | 77.42 | 61.87 | 77.67 | 61.83 | 77.67 | 61.89 |
| 18 | Compressor Dome | 105.67 | 96.91 | 100.55 | 93.90 | 99.18 | 93.06 | 98.63 | 92.89 |
| 19 | Compressor Sump | 109.85 | 102.87 | 104.36 | 99.74 | 102.88 | 98.90 | 102.29 | 98.54 |
| 20 | Inlet Grid | 80.13 | 79.89 | 80.10 | 79.89 | 80.11 | 79.87 | 80.09 | 79.85 |
| 20.1 | Discharge Grid | 72.50 | 84.17 | 72.87 | 63.99 | 73.17 | 63.96 | 73.38 | 63.97 |
| 21 | Tunnel Grid | 69.00 | 67.29 | 71.40 | 67.71 | 71.89 | 67.80 | 72.06 | 67.97 |
| 25 | Indoor Dry Bulb | 80.05 | 79.88 | 80.03 | 79.89 | 80.03 | 79.88 | 80.03 | 79.88 |
| 26 | Indoor Wet Bulb | 59.24 | 59.08 | 59.27 | 58.80 | 59.41 | 58.91 | 59.53 | 59.35 |
| 27 | E102.3 OD Dry Bulb | 81.89 | 82.38 | 81.90 | 82.36 | 81.91 | 82.32 | 81.92 | 82.33 |
| 28 | E102.4 OD Wet Bulb | 60.48 | 60.75 | 60.49 | 60.45 | 60.65 | 60.49 | 61.02 | 61.92 |
| 29 | Discharge Dry Bulb | 68.20 | 70.39 | 69.84 | 70.99 | 70.21 | 71.08 | 70.44 | 71.34 |
| 30 | Discharge Wet Bulb | 55.51 | 55.60 | 55.99 | 55.49 | 56.04 | 55.51 | 56.00 | 55.81 |
| 31 | Blower Watts | 0.00 | 0.35 | 0.00 | 0.35 | 0.00 | 0.35 | 0.00 | 0.35 |
| 32 | Condensing Unit Watts | 0.00 | 1.57 | 0.00 | 1.56 | 0.00 | 1.57 | 0.00 | 1.57 |
| 33 | Voltage A to B | N/A | 208.47 | N/A | 208.94 | N/A | 209.72 | N/A | 209.35 |
| 34 | Voltage B to C | N/A | 207.17 | N/A | 207.47 | N/A | 208.16 | N/A | 208.25 |
| 35 | Voltage L2 to N | N/A | 118.44 | N/A | 118.65 | N/A | 119.06 | N/A | 118.82 |
| 36 | Voltage L3 to N | N/A | 121.39 | N/A | 121.59 | N/A | 122.02 | N/A | 122.42 |
| 37 | AMPS 2 | N/A | 9.31 | N/A | 9.29 | N/A | 9.32 | N/A | 9.33 |
| 38 | AMPS 3 | N/A | 9.37 | N/A | 9.33 | N/A | 9.35 | N/A | 9.35 |
| 39 | kWatts TOTAL | N/A | 1.92 | N/A | 1.91 | N/A | 1.92 | N/A | 1.92 |
| 40 | FREQ. | N/A | 60.00 | N/A | 59.97 | N/A | 60 | N/A | 60.00 |

What is claimed is:

1. A refrigerant composition comprising a mixture of, by weight, about 20% to 25% HFC 32; about 20% to 28% HFC 125; 48% to 54% HFC 134a and about 0.008% to 1% by weight of a lower alkyl alcohol, formulated into a composition compatible with a refrigerating device.

2. A refrigerant composition as defined in claim 1 comprising from about 22% to 24% by weight of HFC 32; about 24% to 26% by weight of HFC 125; about 49.0% to 53.3% by weight of HFC 134a; and about 0.6% to 0.8% by weight of a lower alkyl alcohol.

3. A composition as defined in claim 1, wherein said lower alkyl alcohol is anhydrous.

4. A refrigerant composition as defined in claim 1, wherein said lower alkyl alcohol comprises methanol or ethanol.

5. A refrigerant composition as defined in claim 1, wherein lower alkyl alcohol comprises anhydrous ethanol.

6. A refrigerant composition as defined in claim 1, further comprising a lower alkyl hydrocarbon present in an amount up to 4.0% by weight.

7. A refrigerant composition as defined in claim 6, wherein said lower alkyl is a straight or branched chain $C_1$–$C_6$ alkyl.

8. A refrigerant composition as defined in claim 7, wherein said hydrocarbon based refrigerant is selected from isobutane and propane.

9. A composition as defined in claim 8, wherein said alkyl is propane.

10. A refrigerant composition as defined in claim 1, comprising from about 20–26% by weight of HFC 32; about 22–28% by weight of HFC 125; about 48–54% by weight of HFC 134a; and about 0.2–1.5% by weight of said lower alkyl alcohol.

11. A composition as defined in claim 10, comprising about 23% by weight HFC 32; about 25% by weight HFC 125; about 51.3% by weight HFC 134a and about 0.7% by weight of lower alkyl alcohol.

12. A composition as defined in claim 11, wherein lower alkyl alcohol is selected from ethanol and methanol.

13. A refrigerant as defined in claim 12, wherein said lower alkyl alcohol is ethanol.

14. A refrigerant composition comprising by weight about 20 to 25% HFC 32; about 22 to 28% HFC 125; 48 to 54% HFC 134a; about 0.6% to 1% lower alkyl alcohol and up to about 4% of a lower alkyl hydrocarbon compound.

15. A composition as defined in claim 14, wherein said lower alkyl alcohol comprises a $C_1$ to $C_4$ straight or branched chain alkyl alcohol.

16. A composition as defined in claim 15, wherein said lower alkyl alcohol is selected from methanol and ethanol.

17. A composition as defined in claim 14, wherein said lower alkyl hydrocarbon is selected from isobutane and propane.

18. A composition as defined in claim 14, wherein said lower alkyl alcohol is anhydrous.

* * * * *